(12) United States Patent
Confalonieri et al.

(10) Patent No.: US 12,547,554 B2
(45) Date of Patent: Feb. 10, 2026

(54) DATA IDENTITY RECOGNITION FOR SEMICONDUCTOR DEVICES

(71) Applicant: Micron Technology, Inc., Boise, ID (US)

(72) Inventors: Emanuele Confalonieri, Segrate (IT); Paolo Amato, Treviglio (IT); Daniele Balluchi, Cernusco sul Naviglio (IT); Marco Sforzin, Cernusco sul Naviglio (IT); Danilo Caraccio, Milan (IT); Niccolò Izzo, Vignate (IT); Graziano Mirichigni, Vimercate (IT); Massimiliano Patriarca, Milan (IT)

(73) Assignee: Micron Technology, Inc., Boise, ID (US)

( * ) Notice: Subject to any disclaimer, the term of this patent is extended or adjusted under 35 U.S.C. 154(b) by 216 days.

(21) Appl. No.: 18/235,289

(22) Filed: Aug. 17, 2023

(65) Prior Publication Data
US 2024/0061792 A1    Feb. 22, 2024

Related U.S. Application Data

(60) Provisional application No. 63/399,141, filed on Aug. 18, 2022.

(51) Int. Cl.
*G06F 12/14* (2006.01)
*G06F 12/0804* (2016.01)

(52) U.S. Cl.
CPC ...... *G06F 12/1458* (2013.01); *G06F 12/0804* (2013.01)

(58) Field of Classification Search
CPC .......... G06F 12/1458; G06F 12/0804
See application file for complete search history.

(56) References Cited

U.S. PATENT DOCUMENTS 7,383,587 B2 * 6/2008 Watt ............... G06F 9/45558
  713/193
2021/0064547 A1 * 3/2021 Chhabra ......... G06F 11/1068
(Continued)

OTHER PUBLICATIONS

Xun Jian, Henry Duwe, John Sartori, Vilas Sridharan, and Rakesh Kumar. 2013. Low-power, low-storage-overhead chipkill correct via multi-line error correction. In Proceedings of the International Conference on High Performance Computing, Networking, Storage and Analysis (SC '13). (Year: 2013).*

(Continued)

*Primary Examiner* — Kalpit Parikh
(74) *Attorney, Agent, or Firm* — Brooks, Cameron & Huebsch, PLLC (57) ABSTRACT

Systems, apparatuses, and methods related to data identity recognition for semiconductor devices are described. A system includes a host and a memory device coupled to the host via an interconnect bus. The host includes a host security manager configured to encrypt data of a command, perform a memory integrity check, allow access to memory of a memory device corresponding to an address of a command based on which entity associated with the host sent the command, generate security keys, program security keys into the memory device, program encryption ranges, or any combination thereof. The memory device includes a memory encryption manager and a memory device security manager. The memory device security manager is configured to detect whether a command was sent from a trusted domain of the host or non-trusted domain of the host and identify which entity associated with the host initiated the command.

20 Claims, 8 Drawing Sheets

(56) References Cited

U.S. PATENT DOCUMENTS

2021/0311643 A1* 10/2021 Shanbhogue ......... G06F 3/0622
2022/0198027 A1* 6/2022 Chhabra ............. G06F 12/0238
2022/0207190 A1* 6/2022 Chhabra ............... H04W 12/10

OTHER PUBLICATIONS

AMD—Advanced Micro Devices, Inc., "AMD SEV-SNP: Strengthening VM Isolation with Integrity Protection and More", Jan. 2020, 20 pages.

* cited by examiner

DATA IDENTITY RECOGNITION FOR SEMICONDUCTOR DEVICES

PRIORITY INFORMATION

This application claims the benefit of U.S. Provisional Application No. 63/399,141, filed on Aug. 18, 2022, the contents of which are incorporated herein by reference.

TECHNICAL FIELD

The present disclosure relates generally to semiconductor memory and methods, and more particularly, to apparatuses, systems, and methods for data identity recognition for semiconductor devices.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes Random Access Memory (RAM), Dynamic Random Access Memory (DRAM), Static Random Access Memory (SRAM), Synchronous Dynamic Random Access Memory (SDRAM), and Thyristor Random Access Memory (TRAM), among others. Non-volatile memory can provide persistent data by retaining stored data when not powered and can include NAND flash memory, NOR flash memory, Ferroelectric Random Access Memory (FeRAM), and resistance variable memory such as Phase Change Random Access Memory (PCRAM), Resistive Random Access Memory (RRAM), and Magnetoresistive Random Access Memory (MRAM), such as Spin Torque Transfer Random Access Memory (STT RAM), among others.

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

Virtual computing instances (VCIs) have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. In a software defined data center, storage resources may be allocated to VCIs in various ways, such as through network attached storage (NAS), a storage area network (SAN) such as fibre channel and/or Internet small computer system interface (iSCSI), a virtual SAN, and/or raw device mappings, among others.

The term "virtual computing instance" (VCI) covers a range of computing functionality, such as virtual machines, virtual workloads, data compute nodes, clusters, and containers, among others. A virtual machine refers generally to an isolated user space instance, which can be executed within a virtualized environment. Other technologies aside from hardware virtualization can provide isolated user space instances, also referred to as data compute nodes, such as containers that run on top of a host operating system without a hypervisor or separate operating system and/or hypervisor kernel network interface modules, among others. Hypervisor kernel network interface modules are data compute nodes that include a network stack with a hypervisor kernel network interface and receive/transmit threads. The term "VCI" covers these examples and combinations of different types of data compute nodes, among others.

VCIs, in some embodiments, operate with their own guest operating systems on a host using resources of the host virtualized by virtualization software (e.g., a hypervisor, virtual machine monitor, etc.). The tenant (i.e., the owner of the VCI) can choose which applications to operate on top of the guest operating system. Some containers, on the other hand, are constructs that run on top of a host operating system without the need for a hypervisor or separate guest operating system. The host operating system can use namespaces to isolate the containers from each other and therefore can provide operating-system level segregation of the different groups of applications that operate within different containers. This segregation is akin to the VCI segregation that may be offered in hypervisor-virtualized environments that virtualize system hardware, and thus can be viewed as a form of virtualization that isolates different groups of applications that operate in different containers. Such containers may be more lightweight than VCIs. While the present disclosure refers to VCIs, the examples given could be any type of virtual object, including data compute node, including physical hosts, VCIs, non-VCI containers, virtual disks, and hypervisor kernel network interface modules. Embodiments of the present disclosure can include combinations of different types of data compute nodes.

DETAILED DESCRIPTION

Systems, apparatuses, and methods related to data identity recognition for semiconductor devices are described. A host can include a trusted domain and a non-trusted domain. As used herein, the term "domain" refers to a configurable set of resources, including memory, central processing units (CPUs), network devices, and storage. As used herein, the term "trusted domain" refers to a domain composed of resources that are related to system level functions. The trusted domain can be a higher privilege entity than the non-trusted domain and have exclusive access over the key material used to encrypt and compute MAC on the transferred data. As used herein, the term "non-trusted domain" refers to a domain composed of resources that are not related to system level functions. A command can be sent from a host to a memory device via an interconnect bus that couples the memory device to the host. The command can be granted access or denied access to a specific portion of memory in the memory device based on whether the command originated from a resource in the trusted domain or the non-trusted domain.

The command can include an address for the data corresponding to the command. If the data is located in a portion of the memory that only allows access from a trusted source, the command will be allowed to access the data corresponding to the command if the command originated from a resource in the trusted domain. However, if the command originated from a resource in the non-trusted domain, the command may not be allowed to access the data required to execute the command. This will result in a failure of the host to execute the command.

In some embodiments, the command can be encrypted before it is received by the memory device. In some embodiments, a key identification (keyID) and a TEE bit can be sent to the memory device along with the command. As used herein, the term "keyID" refers to a unique ID used by the memory device to index encryption keys used to encrypt the data. The value of the keyID can be determined by the identity of the software that generated the request and the TEE bit can indicate whether the command originated from a trusted resource.

As memory systems are tasked with performing more complicated operations, more computing devices may be configured to share memory resources. In some approaches, a hash-based message authentication code (HMAC) technique can be implemented into the memory device to provide data integrity. The HMAC can provide data integrity by using a hash to compute a cryptographic tag that can change if the data changes with bounded collision probability.

In contrast, embodiments described herein are directed to a memory device that uses cyclic redundancy circuitry (CRC) for error detection and/or Keccak message authentication code (KMAC) circuitry to compute an authentication tag to provide cryptographic data integrity. Further, the implementation described herein is optimized for implementation into memory devices that include a cache memory.

Memory devices can include data integrity check circuitry and cache memory to determine whether a command sent to the memory device was initiated by a trusted source. The data integrity circuitry can include, but is not limited to, error detection circuitry, data encryption circuitry, data decryption circuitry, data encoder circuitry, data decoder circuitry, or a combination thereof. Error detection circuitry, encryption circuitry, and decryption circuitry are described in more detail with respect to FIG. 3. Encoder and decoder circuitry is described in more detail with respect to FIG. 6.

The cache memory can include circuitry to check the keyID and TEE bit sent to the memory device along with the command and determine whether the command originated from an entity associated with a trusted domain. A determination can be made whether to grant access to a specific portion of memory of the memory device based on the value of the keyID and the TEE bit. As used herein, the term "entity" refers to a computing device or VCI that uses resources of the trusted domain or non-trusted domain of a host. The data integrity check circuitry can be optimized for use in Computer Express Link (CXL) memory devices. For example, the data integrity check circuitry can make use of the expanded capabilities of a CXL interface to perform a data integrity check without the use of circuitry related to hashing data, that is needed to perform data integrity checks in other approaches. More specifically, the identity of the entity that initiated the command can be determined without the use of a MAC code because the keyID is used as an identifier of the entity that sent the data. The memory system can use the capabilities of the CXL interface to send additional data, such as a keyID and a TEE bit, to the memory device along with the command, as well as implement a cache memory into the memory device that can use the keyID and TEE bit to determine whether the command was initiated by a trusted source (e.g., an entity associated with the trusted domain of the host). By using a cache memory of the memory device to determine whether the command was initiated by a trusted source, multiple computing devices can use a shared memory resource in a CXL memory device while restricting access to specific portions of the memory to specific computing devices. For example, the TEE bit and the keyID can be stored in the cache memory.

In some embodiments, the memory system can be a CXL compliant memory system (e.g., the memory system can include a Peripheral Component Interconnect Express (PCIe)/CXL interface). CXL is a high-speed CPU-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as Input/Output (I/O) protocol, memory protocol (e.g., allowing a host to share memory with an accelerator), and coherency interface.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

Figure 1:
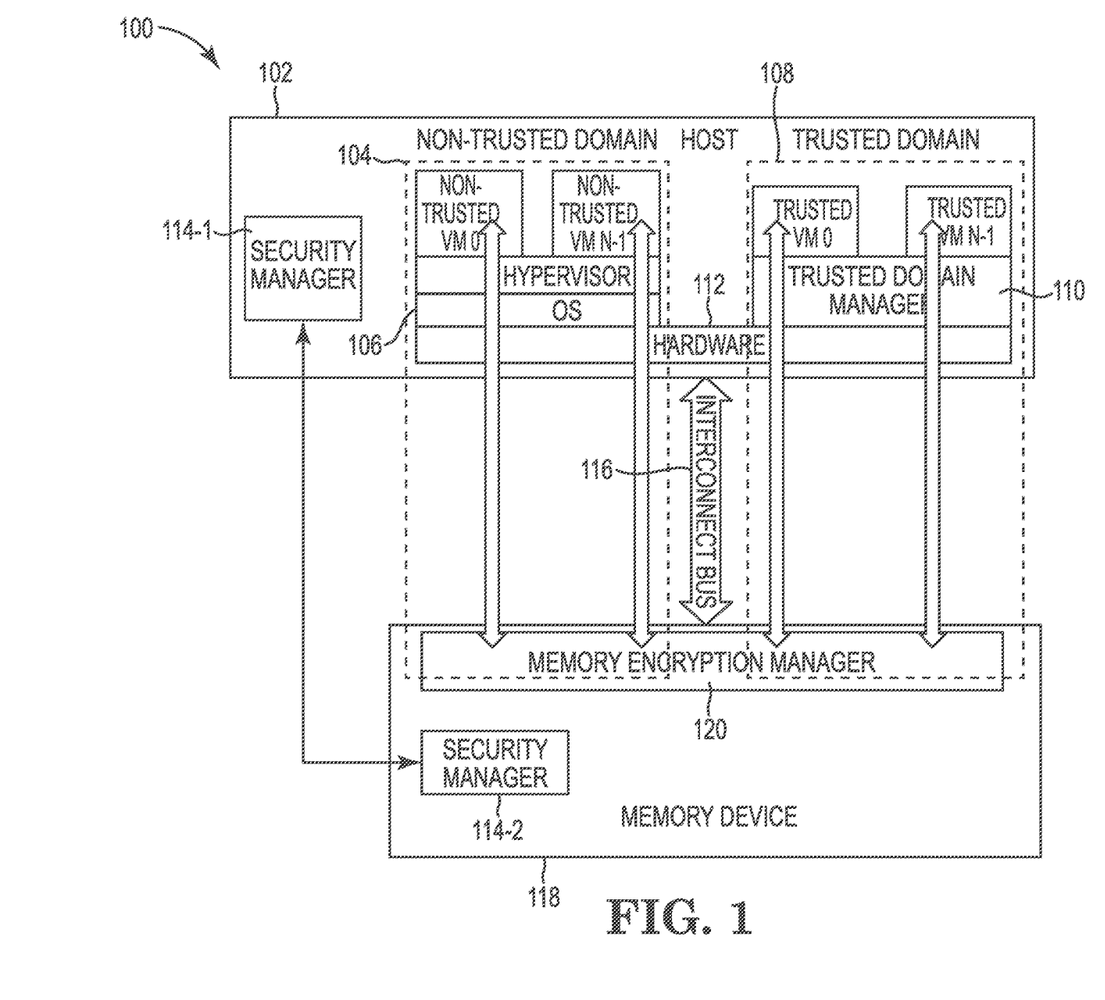
FIG. 1 illustrates an example computing system in accordance with a number of embodiments of the present disclosure.

FIG. 1 illustrates an example computing system 100 in accordance with a number of embodiments of the present disclosure. The computing system can include a host system (e.g., host) 102 that includes a host security manager 114-1 configured to assign a keyID to an entity that originated a command, generate and provision keys, and manage range-based encryption regions in the memory device 118. The security manager 114-1 can be coupled to the host 102 via an interconnect bus 116.

The host 102 can include a non-trusted domain 104. As stated above, the non-trusted domain 104 can be a domain composed of resources that are not related to system level functions of the memory system 100. The non-trusted domain 104 can include a non-trusted domain manager 106 to provision resources (e.g., processing resource, network resources, memory resources, etc.) used by entities associated with the non-trusted domain 104. In some embodiments, the non-trusted domain manager 106 can include a hypervisor and an operating system. In some embodiments, the non-trusted domain 104 can include, but is not limited to, virtual machines, multiple computing resources that share a CXL memory device, and/or a storage architecture that is shared between multiple servers on the same server rack.

The host 102 can also include a trusted domain 108. As stated above, the trusted domain 108 can have a higher privilege than the non-trusted domain 104 and exclusively accessible by a customer. The trusted domain 108 can be mapped to trusted virtual machines that use Secure Encrypted Virtualization Secure Nested Paging (SEV-SNP) technology to isolate the trusted domain 108 from the hypervisor. The trusted domain 108 can be isolated from a hypervisor and exclusively accessible by a specific customer, therefore, a different customer cannot access the specific customer's data in the trusted domain. The trusted domain 108 can include a trusted domain manager 110 to provision resources (e.g., processing resource, network resources, memory resources, etc.) used by entities associated with the trusted domain 108. In some embodiments, the trusted domain manager 110 can include a hypervisor and an operating system. In some embodiments, the trusted domain 108 can include but is not limited to, virtual machines, multiple computing resources that share a CXL memory, and/or a storage architecture that is shared between multiple serves on the same server rack.

The hardware 112 of the host 102 can be the resources that are provisioned by the non-trusted domain 104 and trusted domain 108. Examples of the hardware 112 include processing resources (e.g., one or more processors), memory resources (e.g., volatile and/or non-volatile memory), and/or networking resources (e.g., network interface cards configured to provide access to the interconnect bus 116). The hardware 112 can be shared between the non-trusted domain 104 and the trusted domain 108. The hardware 112 can exchange data between the host 102 and the memory device 118 via the interconnect bus 116. In some embodiments, the memory device 118 can be a CXL memory device 118 and the interconnect bus 116 can be a CXL interconnect bus 116.

The host 102 can include a security manager 114-1. As used herein, the term "security manager" refers to an application specific integrated circuit (ASIC) and/or instructions executed for managing the security configuration of the memory device 118.

The memory device 118 can include a memory encryption manager 120 and a security manager 114-2. In some embodiments, the security managers 114-1, 114-2 can utilize a Trusted Execution Environment Security Protocol (TSP). The memory encryption manager 120 can include an interface to exchange data with the host 102 via the interconnect bus 116. In some embodiments, the interface can encrypt the data via a component, such as a CXL Integrity and Data Encryption (IDE) component, embedded in the interface. Similar to the security manager 114-1 on the host 102, the security manager 114-2 on the memory device 118 refers to an ASIC and/or executed instructions for managing the security configuration on the memory device 118. The security manager 114-2 on the memory device 118 can interact with the security manager 114-1 on the host 102 (e.g., via a connection between physical ports on the host 102 and the memory device 118, which can be separate from or part of the interconnect bus 116). Although FIG. 1 depicts a security manager 114-1 on a host 102 and a security manager 114-2 on the memory device 118, in some embodiments, the security manager 114-1, 114-2 can be on either the host 102 or the memory device 118 instead of on both the host 102 and the memory device 118.

The memory device 118 can be configured to receive a command from the host 102. In some embodiments, the command can be a read command or a write command. Once the memory device 118 receives the command, the security manager 114-2 can detect whether the command was sent from the trusted domain 108 or the non-trusted domain 104 and identify whether an entity associated with the trusted domain 108 or non-trusted domain 104 initiated the command. The security manager 114-2 can further communicate with the security manager 114-1 and manage commands such as discovery, configuration, locking, etc.

Figure 2:
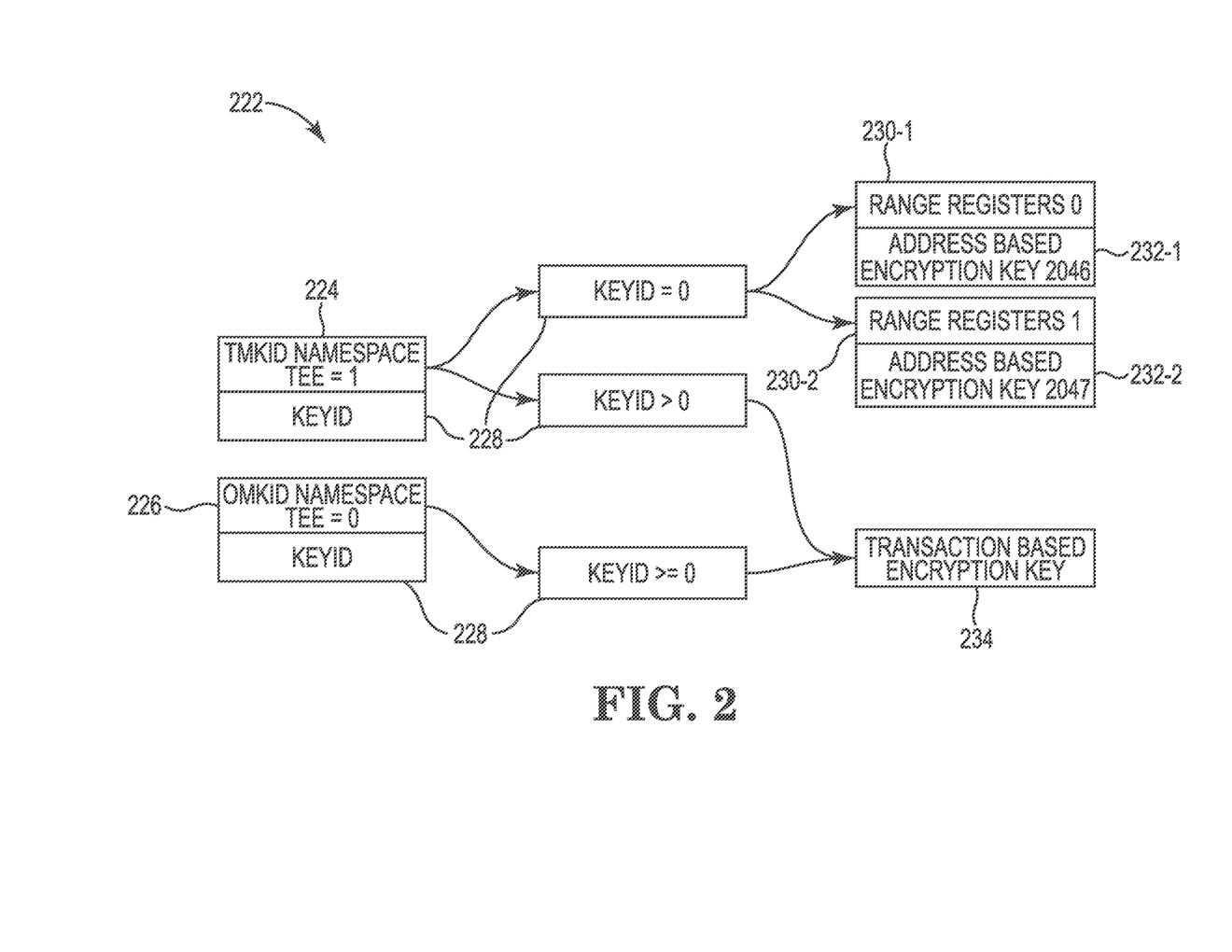
FIG. 2 illustrates a functional block diagram of security architecture to encrypt data in accordance with a number of embodiments of the present disclosure.

FIG. 2 illustrates a functional block diagram of security architecture 222 to encrypt data in accordance with a number of embodiments of the present disclosure. The security architecture 222 can include a trusted machine keyID namespace 224 and an open machine keyID (OMKID) namespace 226. As used herein, the term "namespace" refers to a set of signs (e.g., names) that are used to identify and refer to objects. The trusted machine keyID (TMKID) namespace 224 can refer to a namespace for entities associated with the trusted domain (e.g., trusted domain 108 in FIG. 1) and the OMKID namespace 226 can refer to a namespace for entities associated with the non-trusted domain (e.g., non-trusted domain 104 in FIG. 1). As shown in FIG. 2, the TMKID namespace 224 and the OMKID namespace 226 can each correspond to a keyID 228 used to encrypt data.

In some embodiments, the interface can encrypt data of the command using address-based encryption. The term "address-based encryption" refers to a method of encrypting data in which data is encrypted if the address of the data falls within a specified range of addresses. In some embodiments, each range of addresses for address-based encryption can correspond to a range register 230-1, 230-2 (individually or collectively referred to as range registers 230). As shown in FIG. 2, the security architecture 222 can include multiple range registers 230. Therefore, in some embodiments, the interface can encrypt data of the command if the address of the data is within at least one of multiple (e.g., two) address ranges when the interface uses address-based encryption. Address-based encryption can be related to system level functions for CPUs and not related to user functions. The system level functions can be in the boundary of the trusted domain. Therefore, address-based encryption is only available for data sent from entities associated with the trusted domain of the host.

In some embodiments, TMKID namespace 224 can include a TEE bit. As used herein, the term "TEE bit" refers to a bit used to indicate whether a command was sent from an entity associated with the trusted domain or the non-trusted domain. In some embodiments, the TEE bit can have a value of one if the TEE bit was sent from a trusted source. The TEE bit can be sent to the memory device along with the command. By using the TEE bit to indicate whether the command was sent from an entity associated with the trusted domain or the non-trusted domain, the memory device can read to the TEE bit to determine whether the command can be encrypted using address-based encryption. In some embodiments, the interface can encrypt the data of the command if the command was sent from an entity associated with the trusted domain but refrain from encrypting the data of the command if the command was sent from an entity associated with the non-trusted domain when the interface uses address-based encryption.

A keyID 228 can be sent along with the command when the command is sent to the memory device. The keyID 228 can be used to index encryption keys that are used to encrypt data. In some embodiments, the keyID 228 can have a value of zero when the interface uses address-based encryption. The keyID 228 value of zero can be reserved for encryption keys used for address-based encryption. Therefore, in some embodiments, the value of zero can only be used for a keyID 228 that is being used for address-based encryption.

In some embodiments, the security architecture 222 can include a maximum of 2,048 encryption keys. In some embodiments, two encryption keys 232-1, 232-2 (individually or collectively referred as encryption keys 232), each corresponding to one of two address ranges used for address-based encryption, out of the total number of encryption keys can be assigned for address-based encryption. In other embodiments, there may be more than two encryption keys that correspond to address ranges used for address-based encryptions. The other encryption keys of the total number of encryption keys can be used for transaction-based encryption.

In some embodiments, the interface can encrypt data of the command using transaction-based encryption. The term "transaction-based encryption" refers to a method of encrypting data in which the command includes a request to the memory device to encrypt the data with a key provided by the host. This is in contrast to address-based encryption in which the data is encrypted if the address of the data falls within a specified range of addresses. In some embodiments, the interface can encrypt the data of the command if the command was sent from an entity associated with either the trusted domain or the non-trusted domain when the interface uses transaction-based encryption. The OMKID namespace 226 can be associated with a keyID 228. The keyID 228 used to index encryption keys that are used to encrypt the data of the command can have a value that is greater than zero when the interface uses transaction-based encryption. The keyIDs 228 with values greater than zero can be reserved for encryption keys used for transaction-based encryption. Therefore, in some embodiments, values greater than zero can only be used for a keyID 228 that is being used for transaction-based encryption. In some embodiments, the interface will not encrypt the data of the command if the command was sent from an entity associated with the non-trusted domain.

As shown in FIG. 2, a transaction-based encryption key 234 can be associated with the TMKID namespace 224 and the OMKID namespace 226. Further, data can be encrypted using transaction-based encryption when the TEE bit sent along with the command has a value of zero or if the TEE bit has a value of one.

Figure 3:
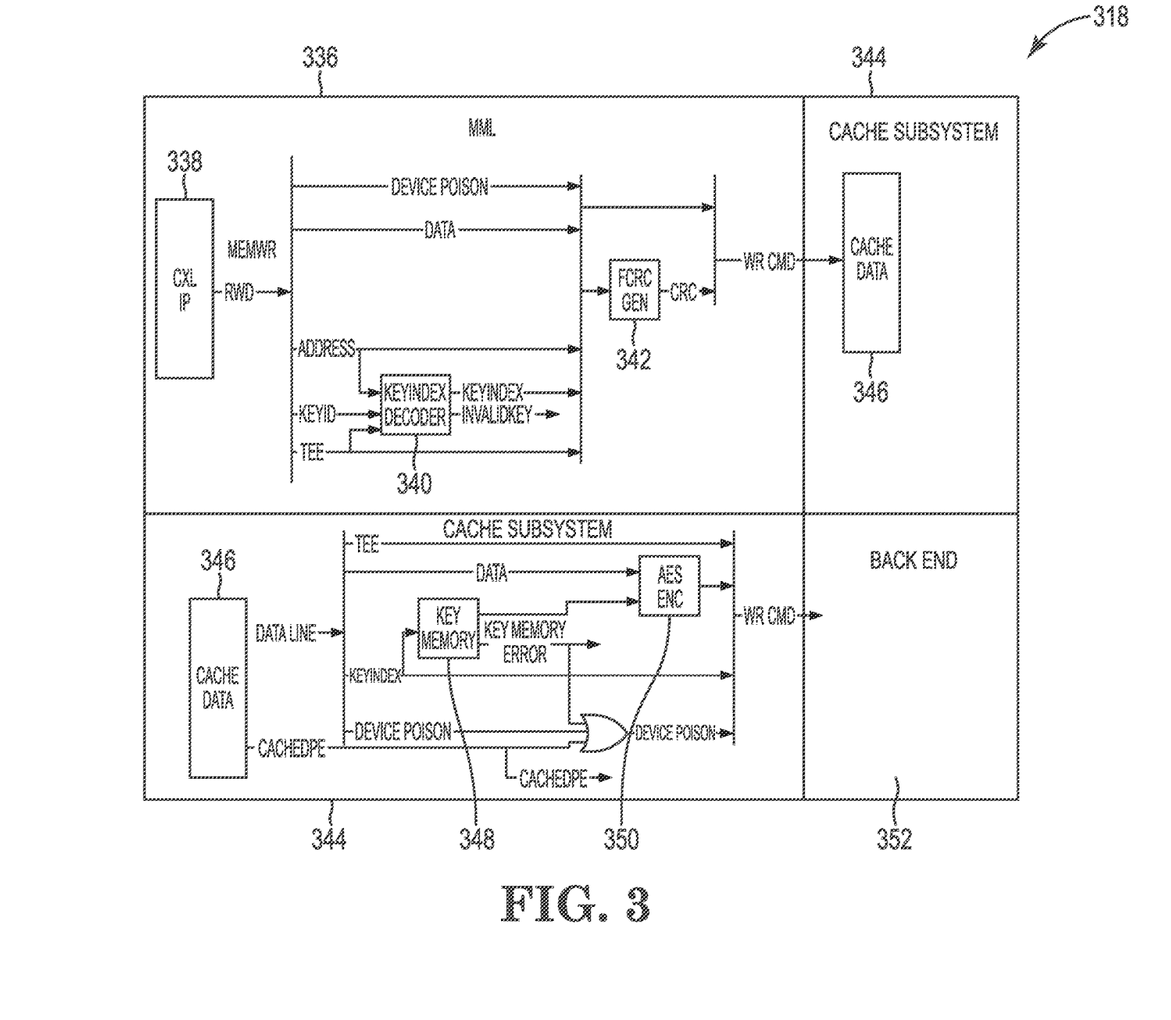
FIG. 3 illustrates a functional block diagram for a memory write and cache synchronization in accordance with a number of embodiments of the present disclosure.

FIG. 3 illustrates a functional block diagram for a memory write and cache synchronization in accordance with a number of embodiments of the present disclosure. The memory device 318 can include a memory management layer (MML) portion 336 a cache portion (e.g., cache) 344, and a back end portion 352.

The MML portion 336 can include a CXL interface 338 to receive a command. In some embodiment, the command can be a MemWrite (MemWr) command. The MML portion 336 can include error detection circuitry 342 and key index circuitry 340. In some embodiments, the key index circuitry 340 can be a key index decoder 340. The CXL IP 338 can send the address, keyID, and TEE bit associated with a command to a key index decoder 340. The key index decoder 340 can check a keyID for a command received by the memory device 318. In some embodiments, if the key index decoder 340 determines that the keyID is invalid, the command will not be allowed access to the memory of the memory device 318 corresponding to the address of the command. Therefore, the command will not be executed. The keyID can be determined to be invalid if the keyID was not initialized properly, as well as in other circumstances. Further, the memory device 318 can refrain from sending the command to the cache portion 344 when a keyID associated with the command is determined to be invalid.

The data, address, keyID, and TEE bit of the command can be sent to the error detection circuitry 342 if the keyID is determined to be valid. In some embodiments, the error detection circuitry 342 can be forward cyclic redundancy check (FCRC) circuitry 342. The error detection circuitry 342 can perform an error detection operation on the data to generate a check value before the data is sent to the cache portion 344. As used herein, the term "check value" refers to a short, fixed-length binary sequence for each block of data to be sent or stored and is appended to the data, forming a codeword. The check value can be calculated from the address, data, TEE bit, and key index of the command. In some embodiments, the device poison bit is not sent to the error detection circuitry 342. As used herein, the term "device poison bit" refers to a bit that indicates whether data associated with the device poison bit is corrupt based on a value of the device poison bit. The device poison bit and the check value can be sent to the cache portion 344.

The cache portion 344 can include a cache storage 346, key memory 348, and encryption circuitry 350. The cache storage 346 in the cache portion 344 shown below the MML portion 336 is the same cache storage 346 in the cache portion 344 shown beside the MML portion 336. The cache storage 346 can receive the command from the MML portion 336 of the memory device 318. In some embodiments, the device poison bit is sent to the cache storage 346 along with the command. The data of the command can be sent from the cache storage 346 to the encryption circuitry 350. In some embodiments, the encryption circuitry 350 can be advanced encryption standard (AES) encryption circuitry 350. Further, the key index can be sent to the key memory 348. In some embodiments, the key index can then be sent to the encryption circuitry 350. The TEE bit, encrypted data, encrypted key index, and device poison bit can then be sent to the back end portion 352 of the memory device 318, which is coupled to the cache portion 344. In some embodiments, the key index can be sent to the back end portion 352 of the memory device 318 without first being transferred to the encryption circuitry 350. Alternatively, a key corresponding to the selected key index can be used to compute a KMAC over the data and the tag of the data can be stored in the back end portion 352 of the memory device 318. When the data is read, the data tag can be read back and checked against a newly computed data tag to detect data integrity violations.

A variety of errors can be detected while the command is in the cache portion 344. These errors can include, but are not limited to, an invalid key, a key memory error, and a cache data path error (DPE). If the key is determined to be invalid, the host will refrain from completing the command. If there is a key memory error or a cache DPE, the device poison bit is set. Setting the device poison bit refers to setting the value of a device poison bit to one to indicate to the memory device 318 that there is an error in the data. In some embodiments, errors in the data can be cured while the data is in the cache portion 344.

Figure 4:
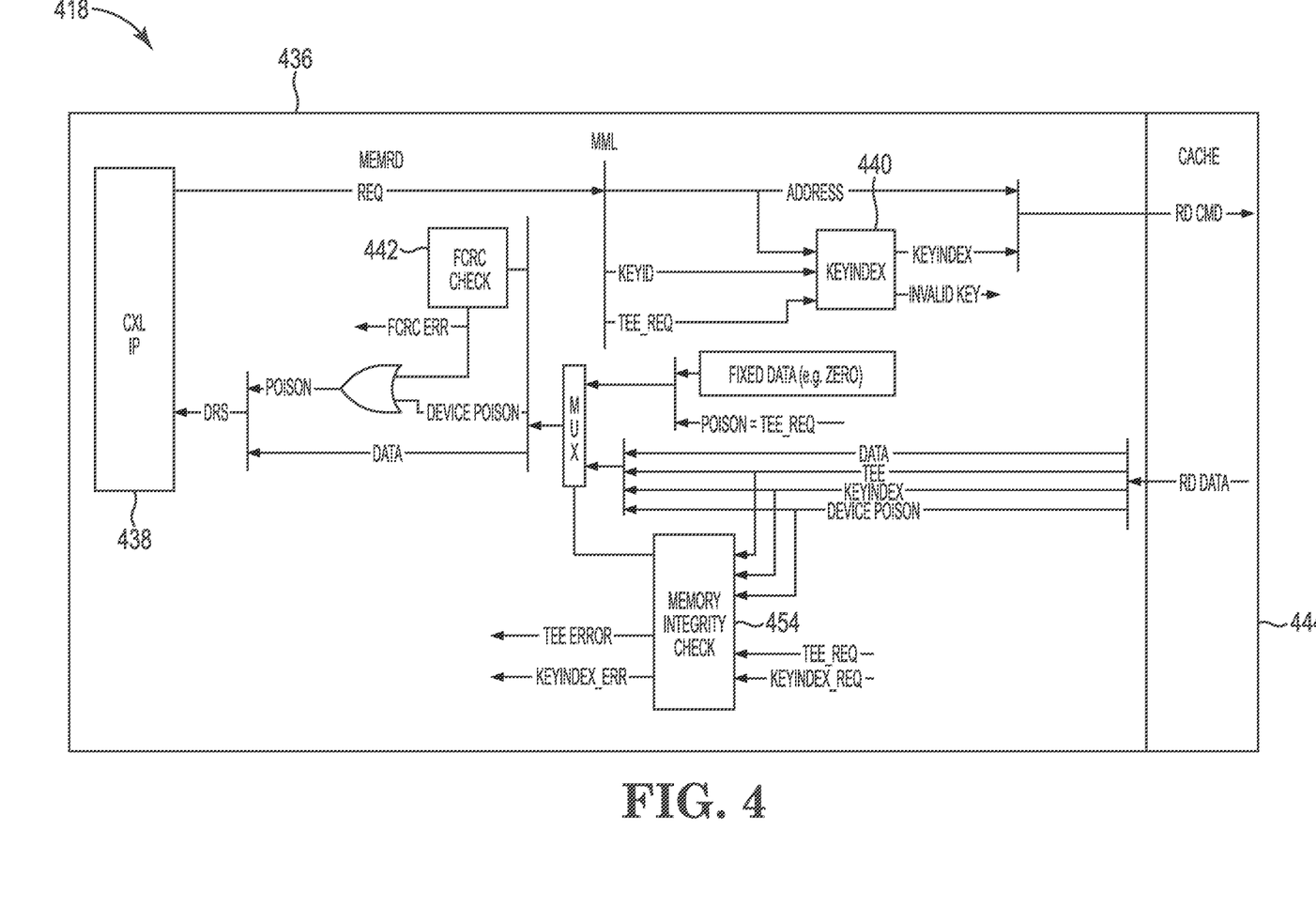
FIG. 4 illustrates a functional block diagram for a memory read, key index check, and TEE bit check in accordance with a number of embodiments of the present disclosure.

FIG. 4 illustrates a functional block diagram for a memory read, key index check, and TEE bit check in accordance with a number of embodiments of the present disclosure. The memory device 418 can include a MML portion 436 and a cache portion 444.

The MML portion 436 can include an interface 438 (e.g., CXL IP), error detection circuitry 442, key index circuitry 440, a multiplexer (MUX), and memory integrity check circuitry 454. The CXL IP 438 can receive a command from the host that results in a cache hit. In some embodiments, the command can be a read command, such as a Memory Read (MemRd) command. In some embodiments, the keyID and TEE bit associated with the command can be sent to the key index 440. The key index can be used to determine whether the key associated with the command is valid. The address, keyID, and TEE bit of the command can then be sent to the cache portion 444. In some embodiments, the address of the command can be sent to the key index 440 before the address is sent to the cache portion 444.

In some embodiments, if the command sent from the host is a read command, the cache portion 444 can return the data read from the memory of the memory device to the MML portion 436. In some embodiments, the memory of the memory device 418 can be a DRAM memory. The data read from the memory of the memory device can include the requested data. In some embodiments, the TEE bit, key index, and device poison can be sent to memory integrity check circuitry 454. The memory integrity check circuitry 454 can determine if there is a data integrity error. If a data integrity error is detected, the value of device poison bit will be set to one. The device poison bit and the data can then be sent to a multiplexer (MUX). Setting the poison bit to a value of one can indicate that that there was at least one of a variety of errors. The errors can include an invalid key, a key index error, or a TEE error. If at least one of these errors are present, fixed data (e.g., zero data) will be returned to the CXL IP 438. If the errors are not present, the TEE bit, key index, and device poison bit can be sent to the MUX along with the data. Further if there are no errors present, the device poison bit can be set to a value of zero. In some embodiments, the TEE bit, key index, and device poison bit can be sent to the MUX without being sent to the memory integrity check circuitry 454.

The TEE bit, key index, and device poison bit can be sent from the MUX to error detection circuitry 442. If the error detection circuitry 442 detects an error, the device poison bit can be set to a value of one to indicate that the data is corrupted. This device poison bit can be sent along with the data to the CXL IP 438. If there is no error, the device poison bit can be set to a value of zero and the requested data will be sent to the CXL IP 438 before being sent to the host.

Figure 5:
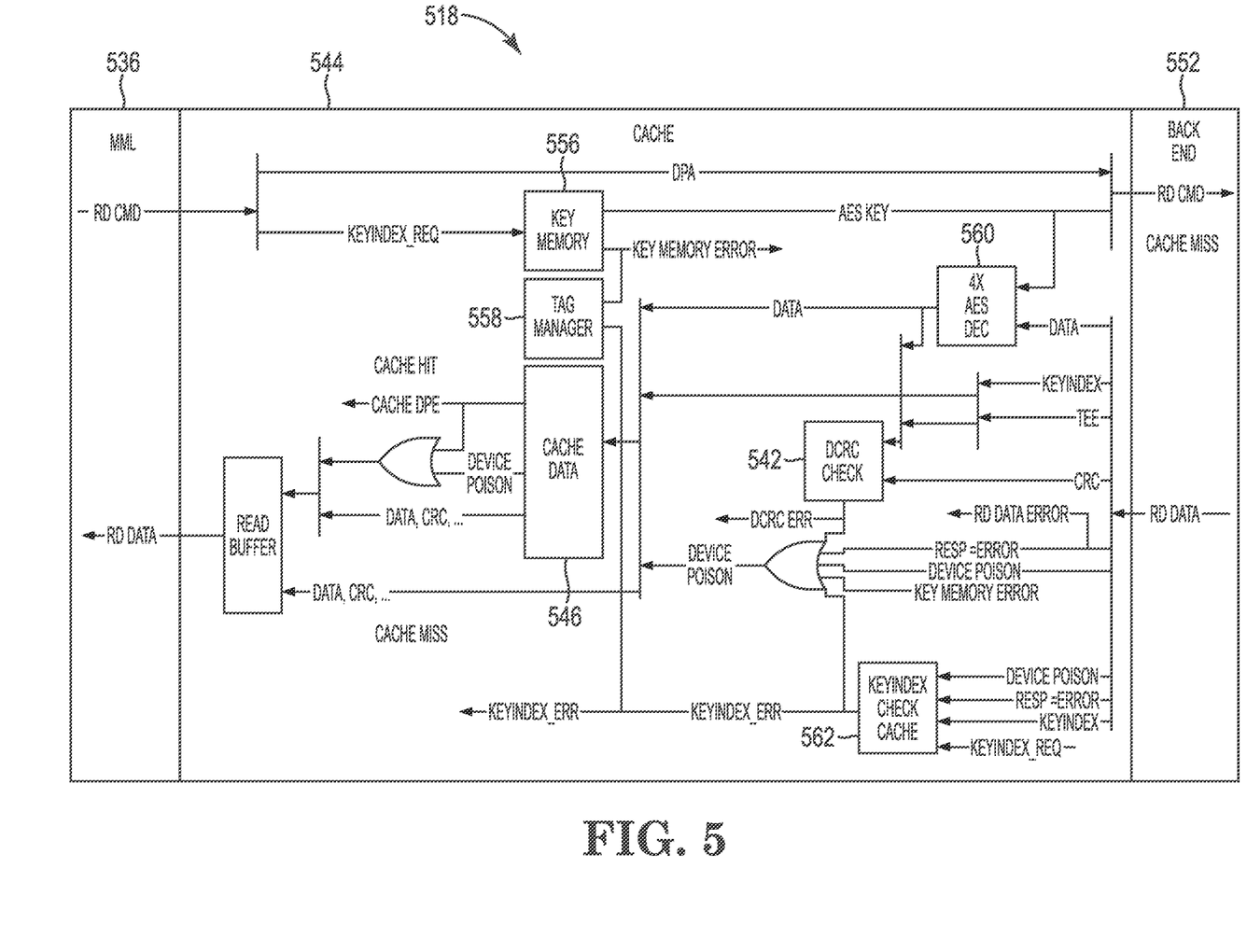
FIG. 5 illustrates a functional block diagram for a read data response in accordance with a number of embodiments of the present disclosure.

FIG. 5 illustrates a functional block diagram for a read data response in accordance with a number of embodiments of the present disclosure. The memory device 518 can include an MML portion 536, a cache portion 544, and a back end portion 552.

The cache portion 544 can include a key memory 556, a tag manager 558 a cache storage 546, decryption circuitry 560, error detection circuitry 542, and a key index check cache 562. The cache portion 544 can receive a command from the MML portion 536. In some embodiments, the command can be a read command. In some embodiments, the data can be sent directly to the back end portion 552 after being received by the cache portion 544. As used herein, directly sending the data to the back end portion 552 refers to sending the data to the back end portion 552 without the cache portion 544 performing any operations on the data. In some embodiments, the data can be decrypted by the decryption circuitry 560 if the data was encrypted before being received by the cache portion 544. The key memory 556 can detect if there is a key memory error. If there is a key memory error, the tag manager 558 can set a cache valid bit to a value of zero to indicate that there is a key memory error.

The back end portion 552 can return the requested data after it receives the command. In some embodiments, the back end portion 552 will return an error response (e.g., Resp=Error) if the back end portion 552 detects an error in the data that cannot be corrected. In some embodiments, the device poison bit, error response, and key index can be sent to the key index check cache 562 to determine if there is a key index error. If there is a key index error, the tag manager 558 can set the device poison bit to a value of one and the data is not copied in the cache storage 546. In some embodiments, the device poison from other memory blocks can mask the key index error. If the key index receives a device poison bit with a value of one, meaning the data was already corrupted when it was read from the memory of the memory device 518, the cache portion 544 may not check for the key index.

The cache portion 544 can perform different operations on the command based on whether a request for the data of the command results in a cache hit or a cache miss. In embodiments in which the command results in a cache miss, the data, key index, TEE bit, error response, device poison bit, and key memory error can be sent to a read buffer and then the data can be sent to the MML portion 536. In embodiments in which the command results in a cache hit, the data, key index, TEE bit, check value, error response, device poison bit and key memory error are sent to the cache storage (e.g., cache data) 546 before being sent to the read buffer. When the data is sent to the cache storage 546, a cache data path error (DPE) may occur. The device poison bit can be set to a value of one in response to the occurrence of the data path error. The data, key index, TEE bit, check value error response, device poison bit, and key memory error can be sent from the cache storage 546 to the read buffer before the data is sent to the MML portion 536.

Figure 6:
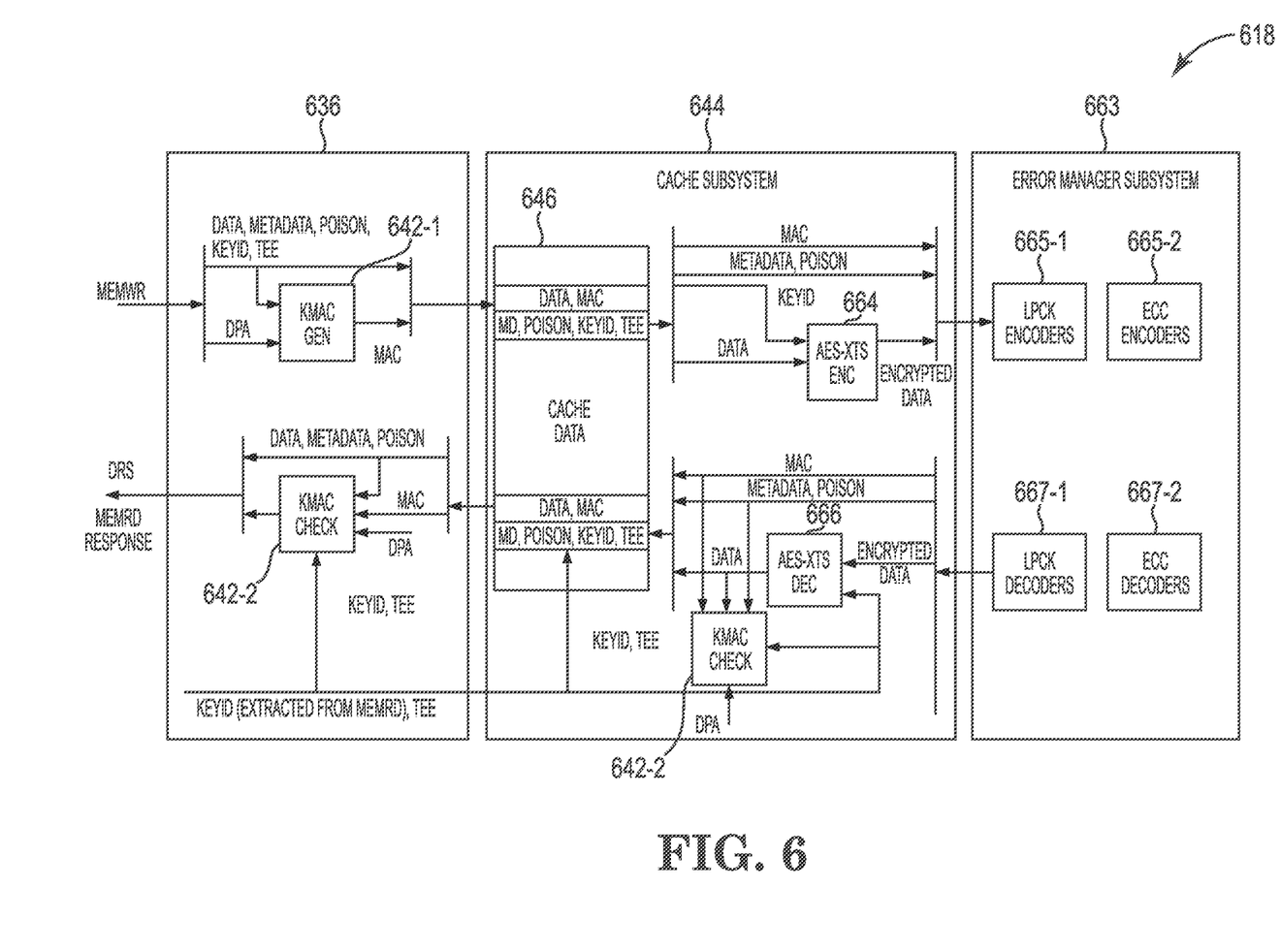
FIG. 6 illustrates a functional block diagram for a (message authentication code) MAC-based integrity check in accordance with a number of embodiments of the present disclosure.

FIG. 6 illustrates a functional block diagram for a MAC-based integrity check in accordance with a number of embodiments of the present disclosure. The memory device 618 includes an MML portion 636, a cache portion 644, and an error manager portion 663.

The MML portion 636 of the memory device 618 can include error detection circuitry 642-1, 642-2 (individually or collectively known as error detection circuitry 642). In some embodiments, the error detection circuitry 642 can be Keccak message authentication code (KMAC) generator circuitry 642-1 and KMAC check circuitry 642-2. As used herein, the term "KMAC circuitry" refers to circuitry to generate or check data based on the KMAC that is used to confirm that a piece of data came from the stated sender, which confirms the authenticity of the data, and has not been changed, which provides data integrity. The MAC and the data of a command can be stored in the memory of the memory device 618.

The MML portion 636 can receive the command from the host. If the command is a write command (e.g., MemWr command), the error detection circuitry 642-1 can generate a MAC while processing the data, metadata, device poison bit, keyID, and TEE bit of the write command. The data, MAC, metadata, device poison bit, keyID, and TEE bit can be sent to the cache storage 646 in the cache storage 646. The data and the keyID can be sent from the cache storage 646 to encryption circuitry 664-1. The MAC, metadata, device poison bit, and encrypted data can then be sent to the error manager portion 663.

The error manager portion 663 can include encoder circuitry 665-1, 665-2 (individually or collectively referred to as encoder circuitry 665) and decoder circuitry 667-1, 667-2 (individually or collectively referred to as decoder circuitry 667). In some embodiments, the encoder circuitry 665 can be low power chipkill (LPCK) encoder circuitry 665-1 and/or error correction code (ECC) encoder circuitry 665-2. In some embodiments, the decoder circuitry 667 can include LPCK decoder circuitry 667-1 and/or ECC decoder circuitry 667-2. The encoder circuitry 665 and decoder circuitry 667 can be used to correct errors in the data.

If the command sent from the host is a read command (e.g., MemRd command), the MAC, metadata, device poison bit, and encrypted data can be sent from the decoder circuitry 667 to the cache portion 644. The decryption circuitry 666 in the cache portion 644 can receive and decrypt the encrypted data. If the address of the data was not stored in the cache storage 646 (e.g., cached), the error detection circuitry 642-2 of the cache portion 644 can use the decrypted data, MAC, metadata, and device poison bit to re-compute the MAC and compare the re-computed MAC to a MAC stored in the memory of the memory device 618. If the two MACs do not match, the data fails the integrity check. In some embodiments, the MAC and the data tag can be used interchangeably while performing a data integrity check. If the address of the data is stored in the cache storage 646, the decrypted data, MAC, metadata, and device poison bit are sent to the cache storage 646. The MAC can then be sent from the cache storage 646 to error detection circuitry 642-2 of the MML portion 636. The data, meta data, device poison bit, keyID, and TEE bit can be output to the host if the MAC passes the integrity check of the error detection circuitry 642-2. If error detection circuitry 642-2 in the cache portion 642 did not receive the data metadata and device poison bit, the data, metadata, and device poison bit can be sent to the error detection circuitry 642-2 of the MML portion 363 before being output to the host.

Figure 7:
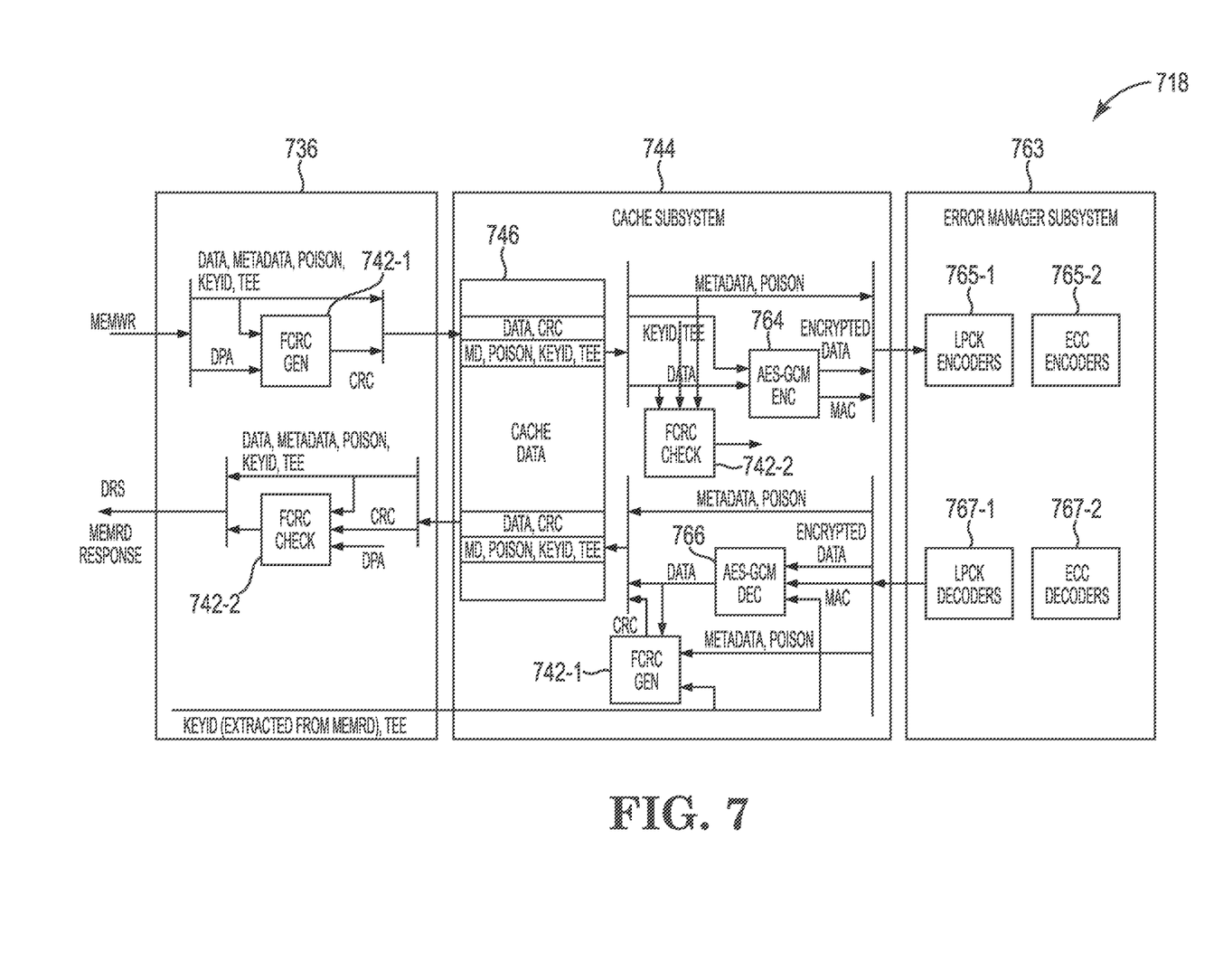
FIG. 7 illustrates a functional block diagram for parallel computation of MAC and encryption/decryption in accordance with a number of embodiments of the present disclosure.

FIG. 7 illustrates a functional block diagram for parallel computation of MAC and encryption/decryption in accordance with a number of embodiments of the present disclosure. The memory device 718 can include an MML portion 736, a cache portion 744, and an error management portion 763.

The MML portion 736 can include error detection circuitry 742-1, 742-2 (individually or collectively referred to as error detection circuitry 742). The error detection circuitry 742 can be FCRC generation circuitry 742-1 and FCRC checking circuitry 742-2. The MML portion 736 can receive a command from the host. Error detection circuitry 742-1 of the MML portion 736 can use the data, metadata, device poison bit, keyID, and TEE bit of the command to generate a check value. The data, metadata, device poison bit, keyID, TEE bit and check value can be sent to the cache storage 746 of the cache portion 744.

In some embodiments, the MAC can be stored in the cache storage 746 of the cache portion 744 but not stored in the memory of the memory device 718. In some embodiments, if new data must be written in the memory of the memory device 718, such as an occurrence of a dirty cache line eviction, data encryption and MAC generation can be performed in parallel before the data is sent to the memory of the memory device 718. Generating the MAC and encrypting the data in parallel can be performed using specific encryption circuitry, such as AES with Galois/Counter Mode (AES-GCM) encryption circuitry or using two encryption engines in parallel, such as AES with XEX Tweakable Block Cipher with Ciphertext Stealing (AES-XTS) circuitry 764 and KMAC circuitry 742. Therefore, if the encryption circuitry 764 is an AES-GCM encryption circuitry, the encryption circuitry 764 can receive a keyID, TEE bit, and data of the command to encrypt the data and generate the MAC. The metadata, poison bit, encrypted data, and MAC of the command can be sent to the error manager portion 763. However, if the encryption circuitry 764 is AES-XTS encryption circuitry, the encryption circuitry 764 can encrypt the data while KMAC circuitry generates a MAC.

The metadata, device poison bit, encrypted data, and MAC of the command can be sent to the encoder circuitry 765 of the error management portion 763. As shown in FIG. 7, the encoder circuitry 765 can be LPCK encoder circuitry 765-1 and/or ECC encoder circuitry 765-2. The metadata, device poison bit, encrypted data, and MAC can be encoded before being stored (e.g., written) into the memory of the memory device 718.

If the command is a read command (e.g., MemRd command), decoder circuitry 767 can decode the metadata, device poison bit, encrypted data, and MAC before they are sent to the decryption circuitry 766 of the cache portion 744. The decoder circuitry 767 can be LPCK decoder circuitry 767-1 and/or ECC decoder circuitry 767-2. The encrypted data and the MAC can be sent to the decryption circuitry 766. The metadata, device poison bit, and MAC can be sent to error detection circuitry 742-1 to generate a check value. The metadata, device poison bit, data, check value, keyID, and TEE bit can be sent to the cache storage 746. The check value can then be sent to the error detection circuitry 742-2 to perform an integrity check on the data. If the check value passes the integrity check, the data, metadata, device poison bit, keyID, and TEE bit can be output to the host.

If the address of the read command was stored in the cache storage 746 (e.g., cached), the check value is checked before outputting the data. If the address of the command is not stored in the cache portion 746, the data and the MAC are read from the memory of the memory device 718. The MAC can be re-computed after the data is decrypted and compared to the MAC stored in the memory of the memory device 718. The data will fail the integrity check if the two MACs do not match.

Figure 8:
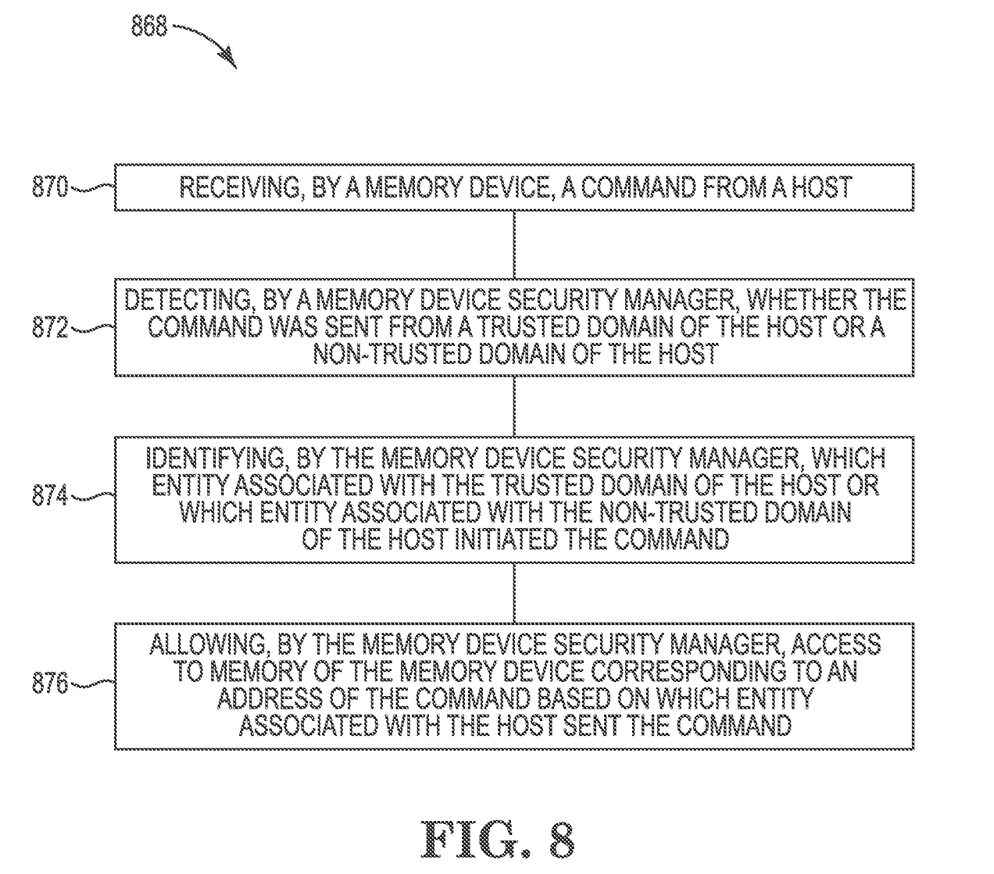
FIG. 8 illustrates a flow diagram of an example method for data identity recognition for semiconductor devices in accordance with a number of embodiments of the present disclosure.

FIG. 8 illustrates a flow diagram of an example method 868 for data identity recognition for semiconductor devices in accordance with a number of embodiments of the present disclosure. The method 868 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 870, the method 868 can include receiving, by the memory device, a command from the host. The command can be a read command or a write command. The command can include an address for the portion of memory in the memory device that corresponds to the data of the command. In some embodiments, a keyID and a TEE bit can be sent to the memory device along with the command.

At block 872, the method 868 can include detecting, by the security manager, whether the command was sent from a trusted domain of the host or a non-trusted domain of the host. The trusted domain can include a trusted domain manager and the non-trusted domain can include a non-trusted domain manager. The trusted domain manager and non-trusted domain manager each provision resources of the hardware of the host, which is shared between the trusted domain and non-trusted domain.

At block 874, the method 868 can include identifying, by the security manager, which entity associated with the trusted domain of the host or which entity associated with the non-trusted entity of the host initiated the command. In some embodiments, the entity can include, but is not limited to, virtual machines that share processing resources and computing devices that share memory resources. The host can send a keyID that is unique to an entity to the memory device along with the command to indicate which entity initiated the command. In some embodiments, the security manager can determine whether the keyID of the command is from an entity associated with the trusted domain or non-trusted domain based on the value of the TEE bit of the command. For example, the security manager can determine that the command is from an entity associated with the trusted domain of the host if the TEE bit of the command has a value of one and the security manager can determine that the command is from an entity associated with the non-trusted domain of the host if the TEE bit of the command has a value of zero.

At block 876, the method 868 can include allowing, by the security manager, access to memory of the memory device corresponding to an address of the command based on which entity associated with the host sent the command. The command can be executed by the host after the security manager allows access to the memory of the memory device corresponding to the address of the command. For example, the command can be executed based on a value of the TEE bit and the determination that the keyID is valid.

The figures herein follow a numbering convention in which the first digit or digits correspond to the figure number and the remaining digits identify an element or component in the figure. Similar elements or components between different figures may be identified by the use of similar digits. For example, 118 may reference element "18" in FIG. 1, and a similar element may be referenced as 318 in FIG. 3. A group or plurality of similar elements or components may generally be referred to herein with a single element number. For example, a plurality of reference elements 114-1 to 114-2 may be referred to generally as 114. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
  a host including a host security manager configured to issue commands to a memory device, each command including a respective:
    key identification (ID); and
    trusted execution environment (TEE) bit;
  the memory device coupled to the host via an interconnect bus, wherein the memory device includes a memory device security manager configured to:
    detect whether the command was sent from a trusted domain of the host or a non-trusted domain of the host based on the TEE bit;
    in response to the command being sent from the non-trusted domain, encrypt data associated with the command using a first encryption key indexed by the keyID;

in response to the command being sent from the trusted domain and in response to the keyID indicating transaction-based encryption is to be used, encrypt data associated with the command using a second encryption key indexed by the keyID; and in response to the command being sent from the trusted domain and in response to the keyID indicating address-based encryption is to be used, encrypt data associated with the command using a third encryption key indexed by a host address associated with the command.

2. The system of claim 1, wherein an interface on the memory device is configured to encrypt the data of the command in response to the address of the data being within at least one of a plurality of address ranges; and wherein the interface is configured to use address-based encryption.

3. The system of claim 1, wherein an interface on the memory device is configured to encrypt the data of the command in response to the command being sent from the trusted domain;

wherein the interface is configured not to encrypt the data of the command in response to the command being sent from the non-trusted domain; and wherein the interface is configured to use address-based encryption.

4. The system of claim 1, wherein the memory device is configured to use the keyID to index encryption keys for encryption of data having a value of zero; and wherein an interface on the memory device is configured to use address-based encryption.

5. The system of claim 1, wherein an interface on the memory device is configured to encrypt the data of the command in response to the command being sent from either the trusted domain or the non-trusted domain; and wherein the interface is configured to use transaction-based encryption.

6. The system of claim 1, wherein the memory device is configured to use the keyID to index encryption keys for encryption of the data of the command having a value that is greater than zero; and wherein an interface on the memory device is configured to use transaction-based encryption.

7. The system of claim 1, wherein the memory device is a Compute Express Link (CXL) memory device.

8. An apparatus, comprising:
a host, wherein the host includes a host security manager that is configured to issue commands to a memory device, each command including a respective:
key identification (ID); and
trusted executive environment (TEE) bit;
the memory device coupled to the host via an interconnect bus, wherein the memory device includes:
a memory management layer (MML) portion and a cache portion; and
a memory device security manager configured to:
detect whether a command was received from a trusted domain of the host or a non-trusted domain of the host based on the TEE bit;
in response to the command being sent from the non-trusted domain, encrypt data associated with the command using a first encryption key indexed by the keyID;
in response to the command being sent from the trusted domain and in response to the keyID indicating transaction-based encryption is to be used, encrypt the data associated with the command using a second encryption key indexed by the keyID; and
in response to the command being sent from the trusted domain and in response to the keyID indicating address-based encryption is to be used, encrypt the data associated with the command using a third encryption key indexed by a host address associated with the command.

9. The apparatus of claim 8, wherein the MML portion includes:
error detection circuitry configured to detect errors in data; and
key index circuitry configured to determine whether the keyID is valid.

10. The apparatus of claim 8, wherein the cache portion includes a keyID storage, a tag manager, a data storage, decryption circuitry, and key index check circuitry.

11. The apparatus of claim 8, wherein:
an error detection operation is performed on the command before the command is transferred to the cache portion; and
the memory device is configured to refrain from sending the command to the cache portion in response to the keyID associated with the command being determined to be invalid.

12. The apparatus of claim 8, wherein the cache portion is configured to perform different operations on the command based on whether a request for the data of the command results in a cache hit or cache miss.

13. The apparatus of claim 8, wherein the memory device includes an error manager portion that includes:
low power chipkill (LPCK) encoder circuitry;
LPCK decoder circuitry;
error correction code (ECC) encoder circuitry; and
ECC decoder circuitry.

14. A method, comprising:
receiving, by a memory device, a command from a host, wherein each command includes a respective:
key identification (ID); and
trusted execution environment (TEE) bit;
detecting, by a memory device security manager, whether the command was sent from a trusted domain of the host or a non-trusted domain of the host based on the TEE bit;
encrypting, by the memory device security manager, data associated with the command using a first encryption key indexed by the keyID in response to the command being sent from the non-trusted domain;
encrypting, by the memory device security manager, the data associated with the command using a second encryption key indexed by the keyID in response to the command being sent from the trusted domain and in response to the keyID indicating transaction-based encryption is to be used; and
encrypting, by the memory device security manager, the data associated with the command using a third encryption key indexed by a host address associated with the command; and
allowing, by the host security manager, access to memory of the memory device corresponding to an address of the command based on which entity associated with the host sent the command.

15. The method of claim 14, further comprising executing the command after the host security manager allows access to the memory of the memory device corresponding to the address of the command.

16. The method of claim 14, further comprising determining, by the memory device security manager, whether the keyID of the command is from an entity associated with the trusted domain or non-trusted domain based on a value of the TEE bit and executing the command based on the value of the TEE bit and the determination that the key ID is valid.

17. The method of claim 14, further comprising:
reading data of the command and a message authentication code (MAC) of the command from the memory of the memory device when the command is a read request that is not cached; and
determining whether the data of the command is valid by comparing a MAC of the data before the data is decrypted and the MAC of the data after the data is decrypted.

18. The method of claim 14, further comprising encrypting data and calculating a MAC of the data in parallel before storing the data in the memory device.

19. The method of claim 14, further comprising encrypting data using Advanced Encryption Standard with Galois/Counter Mode (AES-GCM) circuitry.

20. The method of claim 14, further comprising encrypting data using Advanced Encryption Standard with XEX Tweakable Block Cipher with Ciphertext Stealing (AES-XTS) circuitry.

* * * * *